United States Patent
Gragg

(10) Patent No.: US 7,774,557 B2
(45) Date of Patent: Aug. 10, 2010

(54) STORAGE ACCESS SYSTEM AND METHOD FOR IMAGE FORMING DEVICE

(75) Inventor: Brian D. Gragg, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1692 days.

(21) Appl. No.: 10/628,918

(22) Filed: Jul. 29, 2003

(65) Prior Publication Data

US 2005/0027915 A1 Feb. 3, 2005

(51) Int. Cl.
*G06F 12/00* (2006.01)
*G06F 13/00* (2006.01)

(52) U.S. Cl. ............................ 711/150; 711/E12.035

(58) Field of Classification Search ................ None
See application file for complete search history.

(56) References Cited

U.S. PATENT DOCUMENTS

| | | | | |
|---|---|---|---|---|
| 5,173,939 A | * | 12/1992 | Abadi et al. | 707/9 |
| 6,577,407 B1 | * | 6/2003 | Kopecki | 358/1.15 |
| 2002/0002577 A1 | * | 1/2002 | Garg et al. | 709/104 |
| 2002/0054339 A1 | * | 5/2002 | Arakawa | 358/1.15 |
| 2002/0110014 A1 | * | 8/2002 | Araki et al. | 365/45 |
| 2002/0143942 A1 | * | 10/2002 | Li et al. | 709/225 |
| 2002/0188958 A1 | * | 12/2002 | Miller | 725/112 |
| 2003/0063305 A1 | * | 4/2003 | McIntyre | 358/1.13 |
| 2003/0233544 A1 | * | 12/2003 | Erlingsson | 713/167 |
| 2004/0006616 A1 | * | 1/2004 | Quinn et al. | 709/223 |
| 2004/0025037 A1 | * | 2/2004 | Hair | 713/189 |
| 2004/0165011 A1 | * | 8/2004 | Quijano | 345/821 |
| 2006/0015559 A1 | * | 1/2006 | Yabe et al. | 709/206 |

OTHER PUBLICATIONS

The HP Color LaserJet 4500 Printer; 2002.*

* cited by examiner

*Primary Examiner*—Mardochee Chery

(57) ABSTRACT

In one embodiment, an image forming device includes a storage device for storing data. A storage access manager is configured to coordinate access to the storage device from a plurality of client devices that communicate with the storage device using at least one uncoordinating communication protocol.

27 Claims, 3 Drawing Sheets

Figure 3

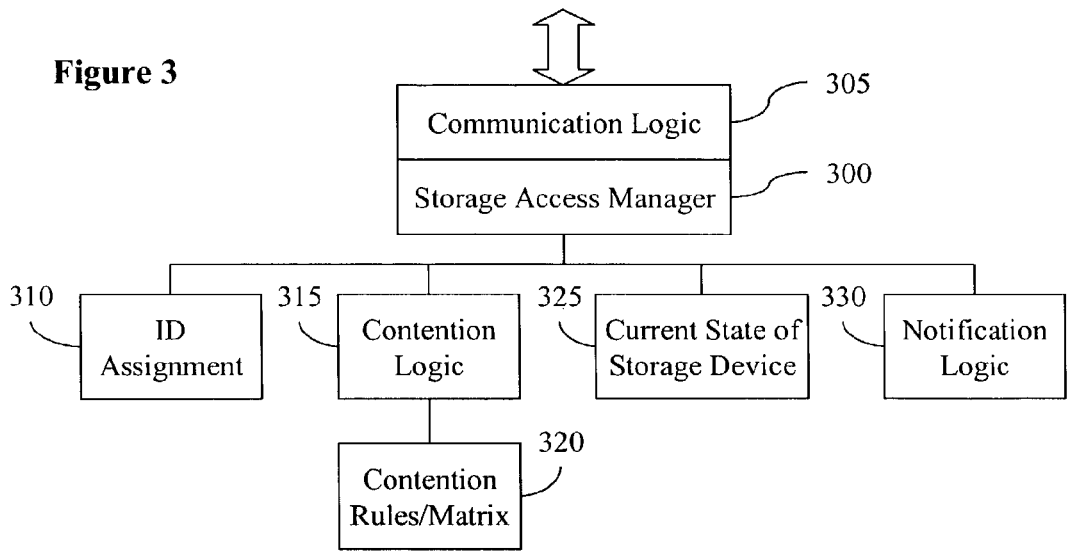

Figure 4

| Contention Matrix | Events | | | | | | | | | |
|---|---|---|---|---|---|---|---|---|---|---|
| | A | B | C | D | E | F | G | H | I | J |
| Y = Yes, the event can occur<br>N = No, the event cannot occur<br>P = The event will be postponed<br>NP = Not Possible<br>1 = Allow if accessing a different file<br>2 = Allowed but cancel browse drive<br><br>While the storage device is in the state below, can the event to the right occur?<br><br>Current Access State: | Read over USB (USBMS or Card Access) | Write over USB (USBMS or Card Access) | Read over network | Write over network | Photo/Proof sheet print | Browse Drive Reading Card | | | | |
| 1  Read over USB (USBMS or Card Access) | NP | NP | Y | N | Y | Y | | | | |
| 2  Write over USB (USBMS or Card Access) | NP | NP | N | N | N | N | | | | |
| 3  Read over network | Y | N | Y | Y¹ | Y | Y | | | | |
| 4  Write over network | N | N | Y¹ | Y¹ | Y¹ | Y | | | | |
| 5  Photo/Proof sheet print | Y | N | Y | N | NP | NP | | | | |
| 6  Browse Drive Reading Card | Y | Y² | Y | Y | NP | NP | | | | |
| 7 | | | | | | | | | | |
| 8 | | | | | | | | | | |
| 9 | | | | | | | | | | |
| 10 | | | | | | | | | | |

STORAGE ACCESS SYSTEM AND METHOD FOR IMAGE FORMING DEVICE

BACKGROUND

Some image forming devices include storage devices such as memory cards. The memory cards can be accessed through both a universal serial bus mass storage (USBMS) protocol and through a local file system (as when accessed through a CIFS server (Common Internet File System) over a network. USBMS accesses the memory cards at a sector level and puts all file system information on the client host controller such that firmware in the image forming device cannot determine what the USB host is doing to the card. Thus, network access to the card may be potentially corrupted each time the USBMS host writes to the card. In some prior devices, when the memory card was written to by USBMS, the local file system was reset, and any file system clients could be disconnected. With network access to the image forming device, access contentions with the USB host could potentially hang the network computers accessing the memory.

BRIEF DESCRIPTION OF THE DRAWINGS

It will be appreciated that the illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vise versa.

FIG. 3 is one embodiment of a storage access manager.

FIG. 4 illustrates one embodiment of a contention matrix defining contention rules.

DETAILED DESCRIPTION OF ILLUSTRATED EMBODIMENTS

Figure 1:
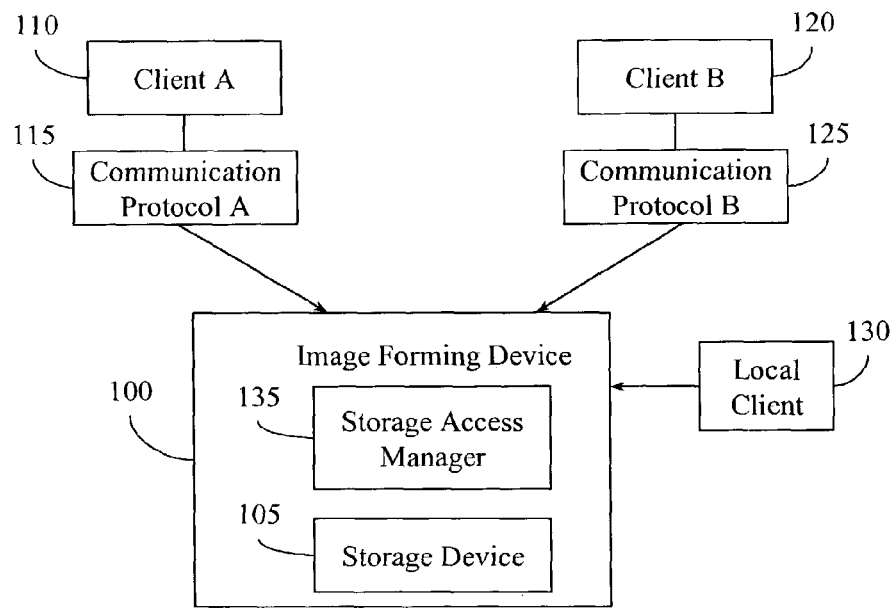
FIG. 1 is one embodiment of an image forming device configured to control access to a storage device.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Computer-readable medium", as used herein, refers to any medium that participates in directly or indirectly providing signals, instructions and/or data to one or more processors for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of electromagnetic radiation, such as those generated during radio-wave and infra-red data communications, or take the form of one or more groups of signals. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, a processor or other electronic device can read. Signals used to propagate instructions or other software over a network, such as the Internet, are also considered a "computer-readable medium."

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmable/programmed logic device, memory device containing instructions, or the like. Logic may also be fully embodied as software.

"Software", as used herein, includes but is not limited to one or more computer readable and/or executable instructions that cause a computer, processor, or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, instructions stored in a memory, part of an operating system, or other type of executable instructions. It will be appreciated by one of ordinary skill in the art that the form of software may be dependent on, for example, requirements of a desired application, the environment it runs on, and/or the desires of a designer/programmer or the like.

"User", as used herein, includes but is not limited to one or more persons, software, computers or other devices, or combinations of these.

In one embodiment, an image forming device is configured with a system to allow an attached storage device, such as a memory card, to be accessed through multiple communication protocols while maintaining the integrity of the storage device. For example, the system can be configured to allow both a universal serial bus (USB) mass storage protocol and a network protocol such as the common internet file system (CIFS) protocol to be simultaneously active and to share the storage device. The system can be configured to control multiple access requests to the storage device in order to reduce or eliminate data corruption. In one embodiment, a control agent (e.g. storage access manager) is configured to control access to the storage device in such a way that corruption is avoided or at least reduced. For example, all clients of the storage device card are made to register with the control agent and request access to the storage device.

Illustrated in FIG. 1 is one embodiment of an image forming device 100 that is configured to provide access to a storage device 105 and be accessible by multiple communication protocols. The image forming device 100 can be a printer, a copier, an all-in-one product, a multifunctional peripheral, or other device that can form an image onto print media. The image forming device 100 can include various types of imaging mechanisms based on, for example, technologies such as drop-on-demand, ink jet, piezoelectric, thermal printing, laser printing, digital imaging, impact printing, or other available technologies. The storage device 105 can include one or more storage devices and can be embodied as any type of computer-readable medium configured to store data. In one embodiment, the storage device 105 can be a memory card used to store data such as digital images or other types of files.

The image forming device 100 can include one or more communication ports that allow the image forming device 100 to be in data communication with one or more clients. For example, client A 110 can be in data communication with the image forming device 100 using a communication protocol A 115. Client B 120 can be connected using a communication protocol B 125 that can be different than protocol A. The protocols may also be the same or a common protocol. In one embodiment, the image forming device 100 can be configured with one or more universal serial bus (USB) ports, one or more network ports, and combinations of these. One or more local clients 130 may also have accessibility to the storage device 105 such as internal functions that can view or manipulate contents within the storage device 105.

Since multiple clients can access the storage device 105, the integrity of the data on the storage device 105 may be affected between simultaneous accesses to the storage device 105. For example, data can be corrupted when communication protocols do not coordinate with each other, thus, one client can be accessing the storage device unknown to other clients. As used herein, uncoordinating communication protocols include protocols from different devices that may compete for access to the storage device 105 where at least one protocol does not provide notice of the access to the other protocol or device. To control access between such uncoordinating communication protocols, a storage access manager 135 is provided. The storage access manager 135 can be configured to coordinate access requests between multiple clients. It will be appreciated that uncoordinating communication protocols may be different protocols and/or may be the same protocol. One example of uncoordinating protocols that are the same is where two clients have access to a storage device and both clients use USB protocol. From another perspective, the storage access manager 135 can be regarded as being configured to control access requests from uncoordinating clients or devices.

In one embodiment, the storage access manager 135 is configured to maintain a current status for the storage device 105 and to determine whether concurrently or simultaneously received access requests are permissible. When the storage device 105 is being accessed by one client, the permissibility of another client simultaneously accessing the storage device 105 can depend on the type of access being requested, the file being accessed, the communication protocol associated with the access request, and/or other desired factors.

A set of access rules can be predetermined to define permissibility of simultaneous access requests from the multiple communication protocols and types of requests. In one embodiment, the access rules can be configured as a contention matrix or map that indicates what types of simultaneous access requests are permissible in view of a current state of the storage device 105. In another embodiment, the access rules, also referred to as contention rules, can be programmatically determined by one or more logic algorithms coded with desired conditions that enforce the contention rules. In this manner, the storage access manager 135 receives all access requests from clients and the corresponding client cannot proceed with the access until the storage access manager 135 grants the access.

If an access request is denied due to a contention, a notification can be sent back to the requesting client denying access. Of course, a variety of options can be configured to handle a denied access request. For example, the request can be denied and the client may be notified to try again at a later time, the access request can be put in a queue and processed when the contention no longer exists, or other type of processing option. With the storage access manager 135, clients that compete for the storage device 105 can be coordinated such that all requests are known and monitored. In this manner, each access request goes through the storage access manager 135 such that each request is approved by the image forming device rather than allowing each client to have direct access.

Figure 2:
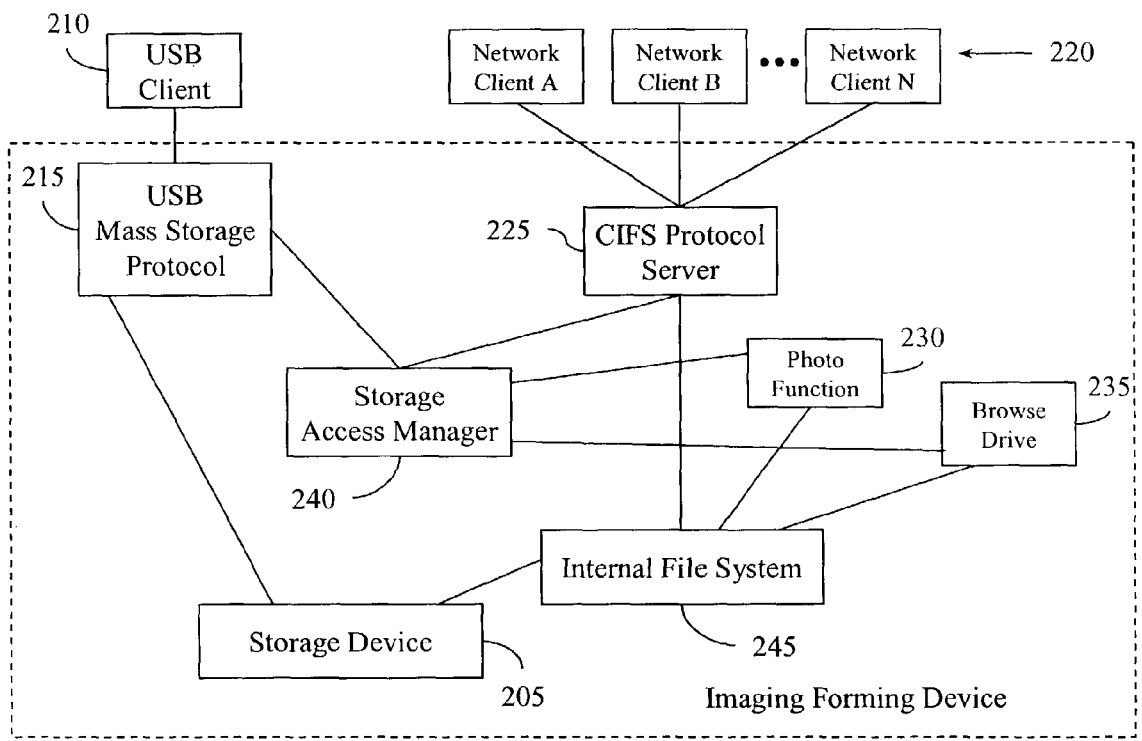
FIG. 2 is another embodiment of an image forming device in communication with multiple clients.

Illustrated in FIG. 2 is another embodiment of an image forming device 200 configured to control access to a storage device 205 from multiple clients operating with different communication protocols. In the illustrated embodiment, one or more clients 210 can be connected to the image forming device 200 through a universal serial bus (USB) port using a USB mass storage protocol 215. The image forming device 200 may also be connected to one or more network clients A-N 220 that communicate through one or more common internet file system (CIFS) servers 225. Internal clients or functions can also be configured within the image forming device 200 that can access the storage device 205. The internal clients may include a photo function 230, a browse drive function 235, or others. A storage access manager 240 is configured to receive access requests from the various clients and to determine which requests are permissible in order to control access contentions and possible data corruption.

In the illustrated embodiment, the image forming device 200 is configured such that access requests from the multiple clients are transmitted to the storage access manager 240 for permission. Once access is granted to a client, the client communicates with the storage device 205. In another embodiment, the storage access manager 240 can be configured to grant access rights to the clients and also control the communication between the clients to the storage device 205. In one embodiment, the storage access manager 240 is configured as logic such as embedded firmware, downloadable software, or other desired form of logic.

As previously mentioned, the USB protocol 215 is a sector-level communication protocol that can access data on the storage device 205 by sectors. The CIFS protocol server 225 is a file-level protocol that accesses data on the storage device 205 at a file level. As such, the CIFS protocol server 225 communicates through, for example, an internal file system which is similar to a computer operating system. The internal file system 245 performs the access to the storage device 205.

The storage access manager 240 can be configured with one or more contention rules that determine when simultaneous access to the storage device 205 is permissible. One example of the access rules is shown in FIG. 4 as a contention matrix 400 which will be described in greater detail below.

Illustrated in FIG. 3 is one embodiment of a configuration for a storage access manager 300 configured to control access to a storage device such as a memory card within an image forming device. A communication logic 305 is configured to communicate with a plurality of clients that may compete for access to the storage device with uncoordinating communication protocols. Examples of uncoordinating protocols may include a sector-level protocol vs. a file-level protocol, a sector-level protocol vs. a sector-level protocol, or other types of protocols which include at least one protocol that does not coordinate or otherwise give notice of access requests to other devices or protocols. In general, uncoordinating communication protocols may include protocols where one client can potentially access the storage device without other clients being aware of such access. The storage access manager 300 is configured to provide coordination of access requests from competing clients and to determine which simultaneous access requests are permissible.

In one embodiment, the storage access manager 300 can include an ID assignment logic 310 configured to assign an identifier to each client/access request received. The identifier can be generated in any desired fashion such as using a random character generator, sequential number assignment, a date-time stamp, combinations of these, or other types of identifiers. In general, the identifier can be configured in any desired manner that allows the storage access manager 300 to process multiple pending and/or active access requests. The identifiers can also be used to associate each access request with its corresponding client such that appropriate messages can be transmitted to the client.

A contention logic 315 can be included that is configured to determine whether a contention between simultaneous access requests exists. If an access request does not create a contention or otherwise possibly conflict with an active access, the access request would be granted. At that point, the corresponding client can proceed with accessing the storage device. The contention logic 315 can be configured with access rights or contention rules that define what types of access are simultaneously permissible. In one embodiment, the access rights can be embodied as a contention matrix 320 that defines a plurality of access states for the storage device and whether each state is permissible with each other, or with other defined states. One example of a contention matrix is shown in FIG. 4 as matrix 400.

With reference to FIG. 4, the contention matrix 400 can include one or more possible access states 405 for a storage device that are shown in numeric rows 1-10. The access states 405 can also be considered as possible access operations. Using the configuration shown in FIG. 2 as an example, some possible access states from a variety of communication protocols are shown for the storage device 205. The illustrated states are based on a configuration having a USB client, a network client such as a CIFS protocol, a photo function that allows the viewing of a proof sheet, and a browse drive function. The storage device in this case is a memory card. Of course, other types and combinations of protocols, access operations, and states can be defined.

As shown in FIG. 4, some possible access states 405 include read and write over the universal serial bus (USB) (e.g. rows 1-2), read and write over the network (e.g. rows 3-4), photo access (e.g. row 5), and browse drive access (e.g. row 6). The possible access states are duplicated in the alphabetic columns of the matrix 400 as possible access requests/events 410. The intersection between the current access states 405 and the access requests 410 form contention matrix values 415 that indicate the permissibility of a simultaneous access. In other words, the contention values 415 define how an access request will be processed based on the current access state for the storage device. Of course, it will be appreciated that other types of access requests and states can be defined based on the types of clients and communication protocols used to communicate with an image forming device. The contention matrix 400 may also include states where multiple USB events may exist from multiple competing USB clients that may compete for access to the storage device.

With further reference to FIG. 4, one example of determining the permissibility of an event may be as follows. Suppose the current state 405 of the storage device is state "2" which is "write over USB." This means that the storage device (e.g. memory card) is currently being accessed by a write command from a first client communicating using the USB protocol. Then suppose another access request is received from another client that is event C "read over network." This means that another client has requested to read data from the storage device and the request was received from a network protocol (e.g. CIFS). The contention logic 315 would determine the current state of the storage device which would be state "2" and determine the permissibility or contention of the access request "C." In this case, the contention value shows a permissibility of "N" which means "no, the event cannot occur." The access request may then be denied and the client requesting such access can be notified. Of course, other options for processing the denied request can be configured such as postponing the request and granting access at a later time.

As another example, suppose the current access state 405 of the storage device is state "3" which is "read over network." This means that a first client is reading from the storage device over a network connection and protocol. Then suppose an access request is received by the image forming device to write data to the storage device and the request is received from a client connected via the network and using a network communication protocol. The storage access manager 300 would receive the access request, determine the type of request, and determine its contention state with the current state of the storage device. In this case, the type of access corresponds to event "D" which is "write over network." The contention value 415 between state "3" and event "D" is "$Y^1$" which has been defined as "yes, the event can occur" but it will be allowed only if the access request is for a different file. Thus, if the event D is requesting to write to a different file than the file currently being read from the storage device, the access request will be granted. As mentioned previously, it will be appreciated that other types of contention values/states 415 can be defined for the current access states 405 and the access events 410.

With further reference to FIG. 4, a few contention states 415 include the values "NP" which designate a status of "not possible." In the illustrated embodiment, the "NP" states were defined based on only one USB client being connected to the image forming device. In the illustrated embodiment, it is assumed that the one USB client would not submit multiple access requests to the storage device simultaneously. Thus, if the current state of the storage device is state "1" where it is being read from the USB protocol, the USB client would not also be submitting read and/or write requests simultaneously. Hence, these contention states 415 are defined as not possible. Of course, the contention states 415 can be defined with multiple USB clients such that the storage device might receive multiple simultaneous access requests from multiple USB protocol devices. In another embodiment, one USB client might be configured to submit multiple access requests so that appropriate contention values 415 would be defined to address those events.

With reference again to FIG. 3, the storage access manager 300 can be configured to maintain a current state of the storage device 325 based on currently active access requests that have been granted. When a new access request is received, the contention logic 315 can be configured to determine the current state of the storage device and then determine whether a contention would occur from the received request based on the contention rules 320. Once the permissibility of the access request is determined, a notification logic 330 can be configured to transmit a message to the requesting client. The message can notify the requesting client, for example, that access is granted, denied, postponed, or other predefined notice.

It will be appreciated that the contention matrix 320 can be configured in a variety of ways. For example, the defined contention states and/or conditions may be programmatically determined based on a contention algorithm that can determine the permissibility of simultaneous access requests based on predetermined allowable access conditions. In another embodiment, the contention matrix 320 can be embodied in different forms such as a map, a table, or other data structure that allows for the determination of the access conditions and contention states.

Figure 5:
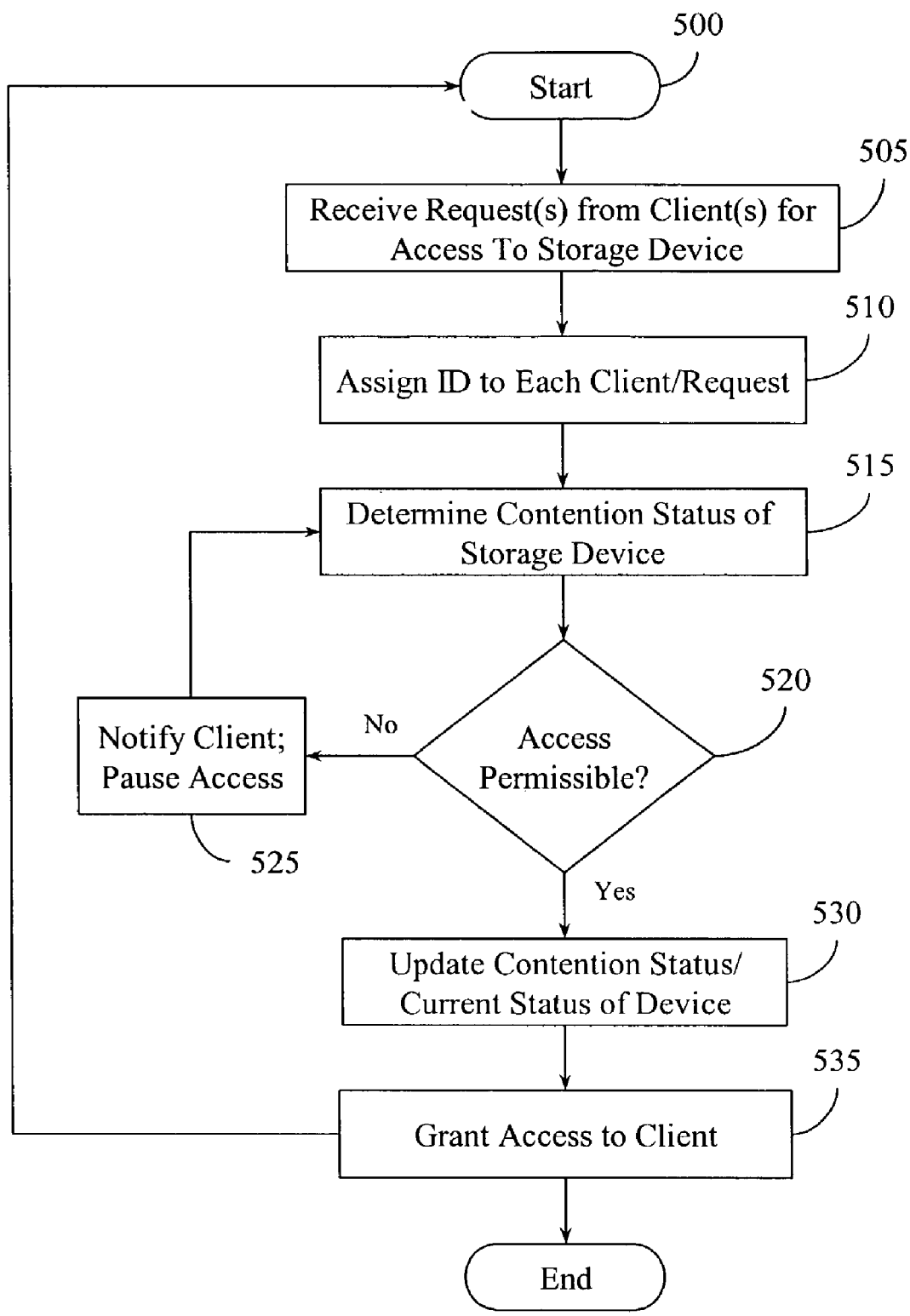
FIG. 5 illustrates one embodiment of methodology for processing an access request to a storage device.

Illustrated in FIG. 5 is one embodiment of a methodology 500 for processing multiple access requests in an image forming device. The illustrated elements denote "processing blocks" and represent software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, do not depict syntax of any particular programming language. Rather, the diagram illustrates functional information one skilled in the art could use to fabricate circuits, generate software, or use a combination of hardware and software to perform the illustrated processing. It will be appreciated that electronic and software applications may involve dynamic and flexible processes such that the illustrated blocks can be performed in other sequences different than the one shown and/or blocks may be combined or, separated into multiple components. They may also be implemented using various programming approaches such as machine language, procedural, object oriented and/or artificial intelligence techniques. The foregoing applies to all methodologies described herein.

With reference to FIG. 5, when a request to access a storage device on an image forming device is received, the process is initiated to determine whether the access is permissible (Block 505). In one embodiment, each client and/or access request is assigned an identifier to distinguish it from other clients/requests (Block 510). In another embodiment, assigning an identifier may not be required depending on, for example, the communication architecture, protocols, or other configurations. Based on the type of received access request, a contention status of the storage device is determined (Block 515) and a determination is made whether the access is permissible (Block 520).

As discussed in a previous embodiment, a set of access rights or contention rules can be predetermined to define the permissibility of simultaneous access to the storage device. The simultaneous access can be defined based on, for example, the type of access requested and the type of communication protocol associated with the access request. Of course other types of factors can be used to define the contention rules. In one embodiment, the contention rules can be defined according to a contention matrix similar to the matrix 400 shown in FIG. 4. A set of possible access states can be defined based on types of access requests and types of communication protocols used. For each possible type of access defined, a contention status/value can then be defined with all the types of access.

When an access request is received, it is compared to the current access state of the storage device to determine whether a contention will be created if the received access request is granted. If access is not permissible (Block 520), the requesting client is notified and access is not granted (Block 525). In one embodiment, the denied request can be paused and allowed at a later time once the contention no longer exists. The denied request may also be simply terminated where the client would have to re-submit the request at a later time. Of course, the manner in which an access request is processed can be defined within the contention rules that define different states such as an unconditional access, conditional access, no access, or other types of conditions. Examples of some possible contention conditions are shown in FIG. 4.

If access is permissible at Block 520 (e.g. the access request will not create a contention with the current state of the storage device), the contention status/current state of the storage device is updated to reflect the simultaneous access (Block 530). Access can then be granted to the requesting client (Block 535). The process can then return until another access request is received or can terminate until reinitiated by a new access request.

With the described embodiments, an image forming device can be configured to allow a storage device(s), such as one or more memory cards, to be accessed through multiple protocols, one or more of which may be an uncoordinating protocol, while maintaining card integrity. For example, both the USB Mass Storage protocol and the network CIFS protocol can be simultaneously active and able to share the memory card device.

Suitable software for implementing the various components of the present system and method using the teachings presented here include programming languages and tools such as Java, Pascal, C#, C++, C, CGI, Perl, SQL, APIs, SDKs, assembly, firmware, microcode, and/or other languages and tools. The components embodied as software include computer readable/executable instructions that cause one or more computers, processors and/or other electronic device to behave in a prescribed manner. Any software, whether an entire system or a component of a system, may be embodied as an article of manufacture and maintained as part of a computer-readable medium as defined previously. Another form of the software may include signals that transmit program code of the software to a recipient over a network or other communication medium. It will be appreciated that components described herein may be implemented as separate components or may be combined together.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An image forming device comprising:
    a storage device for storing data; and
    a storage access manager configured to coordinate access to the storage device from a plurality of client devices that communicate with the storage device using at least one uncoordinating communication protocol.

2. The image forming device of claim 1 wherein the storage access manager is configured to coordinate simultaneous access to the storage device from a sector-level communication protocol and a file-level communication protocol.

3. The image forming device of claim 2 wherein the sector-level communication protocol includes a universal serial bus protocol and the file-level communication protocol includes a common internet file system protocol.

4. The image forming device of claim 1 wherein the storage access manager further includes a contention matrix configured to determine contention states for accessing the storage device.

5. The image forming device of claim 1 further including a universal serial bus communication port for communicating to the storage device and, a network communication port for communicating to the storage device.

6. The image forming device of claim 1 further including a plurality of universal serial bus communication ports configured to provide access to the storage device.

7. The image forming device of claim 1 wherein the storage device includes logic to notify a client device whether an access request for the storage device is permissible.

8. The image forming device of claim 1 wherein storage access manager is embodied as logic.

9. The image forming device of claim 1 wherein storage device is one or more memory cards.

10. The image forming device of claim 1 wherein the storage access manager includes storage access manager means to coordinate the access to the storage device.

11. An article of manufacture embodied in a computer-readable storage medium for use in an image forming device having a storage device accessible by at least a first communication protocol and a second communication protocol, the article of manufacture comprising:
    first processor executable instructions for causing a processor to maintain a current access state for the storage device;
    second processor executable instructions for causing a processor to determine a contention status between the current access state and a received access request for accessing the storage device based on a contention logic, the contention logic defining rights for simultaneous access to the storage device from the at least first communication protocol and the second communication protocol where the at least first communication protocol does not provide notice of an access to the second communication protocol; and
    third processor executable instructions for causing a processor to determine whether the received access request is permissible based on the contention status.

12. The article of manufacture as set forth in claim 11 wherein the contention logic is configured to coordinate simultaneous access to the storage device by one or more clients using the first communication protocol and one or more clients using the second communication protocol.

13. The article of manufacture as set forth in claim 11 wherein the contention logic is configured as a contention matrix that defines a plurality of access types to the storage device and whether simultaneous access is permissible between each other.

14. The article of manufacture as set forth in claim 11 wherein the contention logic is configured based on the first communication protocol being a sector-level protocol and the second communication protocol being a file-level protocol.

15. The article of manufacture as set forth in claim 11 wherein at least a first communication protocol and the second communication protocol include at least one uncoordinating communication protocol.

16. The article of manufacture as set forth in claim 11 further including fourth processor executable instructions for causing a processor to notify a first client when access to the storage device occurs by a second client.

17. The article of manufacture as set forth in claim 11 wherein the at least first and the second communication protocols include the same protocol.

18. The article of manufacture as set forth in claim 11 further including fifth processor executable instructions for causing a processor to assign an identifier to each client requesting access to the storage device.

19. The article of manufacture as set forth in claim 11 wherein the second processor executable instructions include storage access manager means for controlling access to the storage device.

20. A method of providing access to a storage device within an image forming device, the method comprising the steps of:
    providing access to the storage device in accordance with multiple communication protocols where at least one of the communication protocols does not provide notice of an access to the other protocols;
    coordinating multiple access requests to the storage device based on contention rules that define permissibility of simultaneous access requests from the multiple communication protocols; and
    determining whether a received access request is permissible based on a current access state of the storage device and a contention with the received access request based on the contention rules.

21. The method as set forth in claim 20 further including defining the contention rules based on types of access requests and a type of communication protocol associated with each access request.

22. The method as set forth in claim 20, the providing access step including providing access based on a sector-level communication protocol and a file-level-communication protocol.

23. The method as set forth in claim 20 further including notifying a client requesting access to the storage device whether access is permissible.

24. The method as set forth in claim 20 further including assigning an identifier to each access request received.

25. The method as set forth in claim 20 further including notifying a first client when a second client accesses the storage device.

26. The method as set forth in claim 20 wherein the multiple communication protocols include at least one uncoordinating communication protocol.

27. The method as set forth in claim 20 wherein the multiple communication protocols include the same communication protocol.

* * * * *